United States Patent
Helfman

(12) 
(10) Patent No.: US 10,991,136 B1
(45) Date of Patent: Apr. 27, 2021

(54) SYSTEM FOR VISUALIZING FUNCTIONS THAT DEPEND ON MULTIPLE PARAMETERS

(71) Applicant: Keysight Technologies, Inc., Minneapolis, MN (US)

(72) Inventor: Jonathan Helfman, Half Moon Bay, CA (US)

(73) Assignee: Keysight Technologies, Inc., Santa Rosa, CA (US)

(*) Notice: Subject to any disclaimer, the term of this patent is extended or adjusted under 35 U.S.C. 154(b) by 0 days.

(21) Appl. No.: 15/608,874

(22) Filed: May 30, 2017

(51) Int. Cl.
   - *G06T 11/20* (2006.01)
   - *G06F 3/0484* (2013.01)
   - *G06F 3/0482* (2013.01)

(52) U.S. Cl.
   CPC .......... *G06T 11/206* (2013.01); *G06F 3/0482* (2013.01); *G06F 3/0484* (2013.01); *G06T 11/203* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 6,750,864 B1* | 6/2004 | Anwar | ................ | G06T 11/206 345/440 |
| 8,749,553 B1* | 6/2014 | Krasovsky | ............ | G06T 11/203 345/440 |
| 9,665,259 B2* | 5/2017 | Lee | ................ | G06F 3/04845 |
| 2007/0097123 A1* | 5/2007 | Loop | ................ | G06T 11/203 345/442 |
| 2007/0216683 A1* | 9/2007 | Navratil | ................ | G06T 11/206 345/440 |
| 2009/0027393 A1* | 1/2009 | Kelly | ................ | G06T 11/203 345/440 |
| 2010/0110078 A1* | 5/2010 | Yanai | ................ | G06T 11/206 345/440 |
| 2015/0084963 A1* | 3/2015 | Green | ................ | G01D 7/02 345/440 |
| 2015/0346972 A1* | 12/2015 | Boekling | ................ | G06T 11/60 703/2 |
| 2016/0086362 A1* | 3/2016 | Suzuki | ................ | G06T 11/206 345/440 |

* cited by examiner

*Primary Examiner* — Andrew G Yang

(57) ABSTRACT

A method for operating a data processing system to provide a graphic visualization of a function is disclosed. The method includes causing the data processing system to present a first GUI to a user on a display associated with the data processing system, causing the data processing system to receive a text string that defines the function in terms of variable parameters and elementary functions, causing the data processing system to provide a list of the variable parameters, receiving user input specifying row and column parameters selected from the list of variable parameters, and generating a grid plot of the function on the display.

20 Claims, 10 Drawing Sheets

SYSTEM FOR VISUALIZING FUNCTIONS THAT DEPEND ON MULTIPLE PARAMETERS

BACKGROUND OF THE INVENTION

Many systems of interest, whether physical or virtual, are described by functions that depend on two or more parameters. These functions are often either non-linear or their parameters are not independent, and hence, understanding the behavior of the system as these parameters are changed presents significant challenges for anyone attempting to use the system. In principle, the user could program a computer to graph the function in question for any particular choice of the parameters and explore the behavior of the function as the user changes various parameters. However, this solution requires a level of programming expertise that is not available to many would be system users. Furthermore, the types of graphs that are useful for one problem are not optimum for other problems. Finally, multiple graphs may be required to understand the system. These graphs may evaluate different related functions that also depend on the parameters in question. Again, constructing these multi-graph displays presents significant programming challenges.

SUMMARY

The present invention includes a method for operating a data processing system to provide a graphic visualization of a function and computer readable media that causes a data processing system to execute that method. The method includes causing the data processing system to present a first graphical user interface (GUI) to a user on a display associated with the data processing system, causing the data processing system to receive a text string that defines the function in terms of variable parameters and elementary functions, causing the data processing system to provide a list of the variable parameters, receiving user input specifying row and column parameters selected from the list of variable parameters, and generating a grid plot of the function on the display.

In one aspect of the invention, the method includes causing the data processing system to provide values for the variable parameters that are not specified as row or column parameters.

In one aspect of the invention, the elementary functions include augmented elementary functions characterized by internal variable parameters, wherein the internal variable parameters associated with the augmented elementary functions are included in the variable parameter list.

In one aspect of the invention, the data processing system stores default values for the variable parameters.

In one aspect of the invention, the default values comprise values that were previously assigned to the variable parameters.

In one aspect of the invention, the method includes receiving user input specifying first and second sub-plots from the grid plot, causing the data processing system to provide a compound plot from the first and second sub-plots, and displaying the compound plot on the display.

In one aspect of the invention, the method includes causing the data processing system to provide a list of possible graphical formats to be used in generating the grid plot, receiving user input specifying one of the graphical formats, and causing the data processing system to generate the grid plot using the one of the graphical formats.

In one aspect of the invention, each sub-plot of the grid plot includes a plurality of different graphs of the function, each graph is presented in a different graphical format.

In one aspect of the invention, one of the row parameters or the column parameters includes a graphical variable parameter that determines the appearance of a graphical format used to generate the grid plot.

In one aspect of the invention, the function includes a two-dimensional function.

In one aspect of the invention, the function is a vector-valued function.

In one aspect of the invention, the first GUI includes a text box configured to allow a user to type the text string, the text box is characterized by a cursor indicating a current position in the text box at which characters are entered in response to the user input, the data processing system checking that a word that was just finished is entered in response to the user input for a name of a possible augmented elementary function at the cursor location, identifying the augmented elementary function having the name, and assigning an instance of the augmented elementary function corresponding to the identified augmented elementary function whose name matches the name to the word.

In one aspect of the invention, the identified augmented elementary function is characterized by a variable parameter and wherein the data processing system displays the variable parameter together with a default value for the variable parameter in a region of the first GUI when a user selects that instance of the augmented elementary function in the text box.

In one aspect of the invention, the data processing system is configured to receive user input selecting one instance of an augmented elementary function in the text box and to display the variable parameters associated with that instance of the augmented elementary function in the parameter list area.

In one aspect of the invention, the data processing system updates a graph of an expression defined by the text string each time a variable parameter or a column parameter or a row parameter is altered in response to user input.

DETAILED DESCRIPTION

Figure 1:
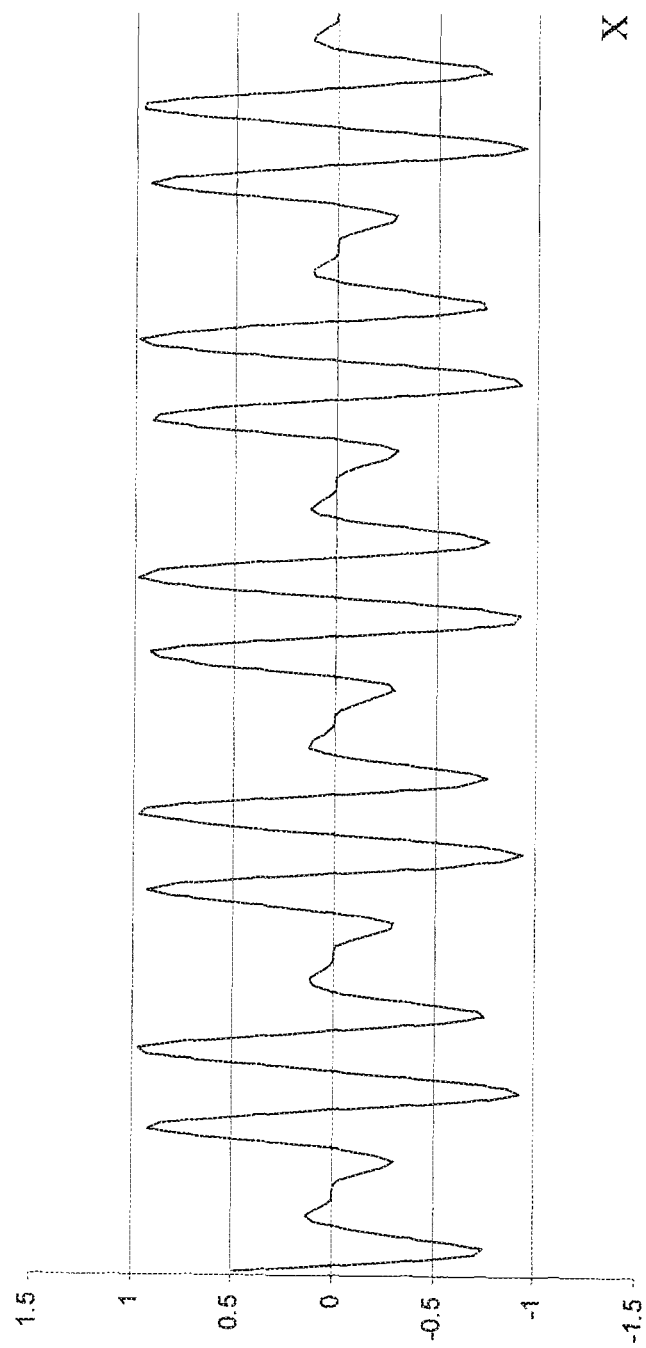
FIG. 1 illustrates a plot for one pair of the parameters and x running from 0 to 100.

Even relatively simple functions can depend on a number of parameters. Exploring the behavior of such a function often involves setting some of the parameters to constants and then varying one or more of the other parameters, referred to as "variable parameters" in the following discussion, to generate graphs that allow the user to obtain a "feel" for the manner in which the function changes when the variable parameters change.

Consider the case in which a user wants to get a "feel" for the manner in which a function $f(a_1, a_2 \ldots a_N, x)$ depends on the parameters $a_i$. One method for obtaining that information would be to graph the function of x for exemplary values of the $a_i$. There are numerous computer programs that will provide a graph of f( ) for specified values of the $a_i$. All of these programs require some programming expertise on the part of the user. For example, a spreadsheet program will graph an array of values. However, the user must program a spreadsheet to create the array that is to be graphed by setting up an array of "x" values and defining another array of "y" values that correspond to f( ) for the given choices of the $a_i$. In addition, the user must be familiar with the syntax of communicating the function to the spreadsheet program. For example, if the function were a simple sine-based wave function of the form $a_i*\sin(a_2x+a_3)$, the user must know how to enter this function in the spreadsheet, which may use a different name for the sine function, e.g. sinef( ) as well as to the units of the argument. i.e., degrees or radians.

At the end of the process, the user will have one graph of the function for a particular choice of the $a_i$. However, in the case of a more complex non-linear function, a single graph will typically not be sufficient to understand the behavior of the function for different choices of the $a_i$. Hence, the user will need to repeat the process for different values of the $a_i$ and collect the resultant graphs into some form of multi-graph display that will allow the user to understand the behavior of the function. Generating the multi-graph display typically requires a different software package and different programming skills, and hence, further complicates the task of understanding the behavior of the function.

The manner in which the present invention provides its advantages can be more easily understood in terms of a class of functions that can be represented by an expression that can be input by typing the expression algebraically on a line in a text editor without using any special programming syntax. The expression includes an independent variable. A plot of this expression is a graph of the expression for each value in a predetermined set of values for the independent variable for particular values of any other parameters included in the expression that are to remain constant over the graph.

Consider a simple function that depends on five parameters, and is represented by the expression:

$$A*\cos(w_1x+\phi_c)*\sin(\phi_s+\cos(w_2x/3)). \quad (1)$$

The user wishes to explore the manner in which the function varies as the two parameters, $\phi_s$ and $\phi_c$, are varied over some predetermined set of values. To compute the function, values for A, $w_1$ and $w_2$ must be entered or assigned default values as part of the function definition. These values will be held constant during the exploration of the dependency on $\phi_s$ and $\phi_c$. For any given values of the two variable parameters, $\phi_s$ and $\phi_c$, the function can be plotted as a function of the independent variable, x, once the constant parameters have been assigned values. A plot for one pair of the parameters and x running from 0 to 100 is shown in FIG. 1, for the case A=1 and $w_1=w_2=1$. Unfortunately, such a plot does not provide enough information to predict how the plot would look for different values of the parameters, $\phi_s$ and $\phi_c$. This problem is particularly acute when the function or functions of interest are non-linear and/or if the value of one parameter might affect how the function behaves for a range of values of another parameter.

Figure 2:
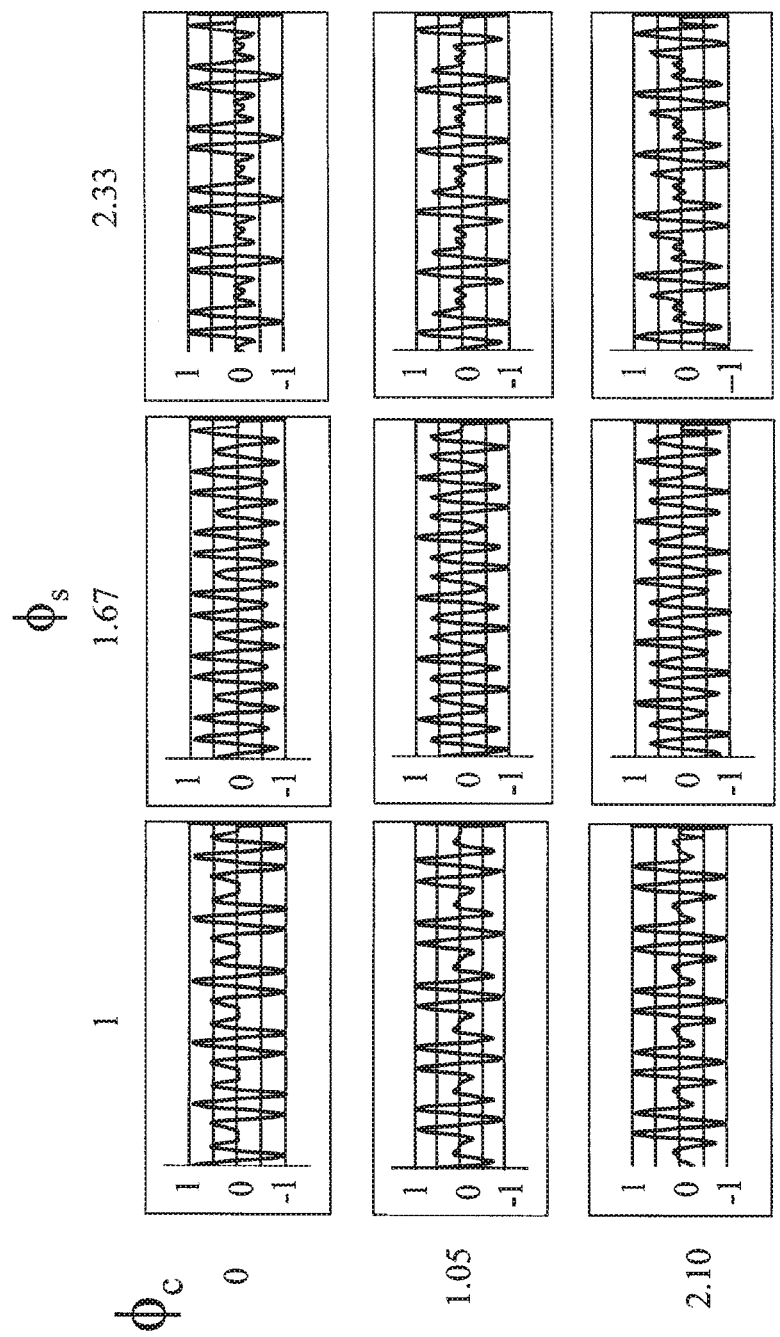
FIG. 2 illustrates an exemplary grid plot for the function represented by the expression of Eq. (1).

In one aspect of the present invention, a data processing system executing the method of the present invention generates a display that will be referred to as a "grid plot" in the present discussion. Refer now to FIG. 2, which illustrates an exemplary grid plot for the function represented by the expression of Eq. (1). A grid plot includes an array of plots of the function for different values of the variable parameters. The display includes a rectangular array of individual plots arranged as a plurality of rows and columns. Each plot displays the function for a particular pair of first and second parameter values. All plots in a given row have the same first parameter value, but different second parameter values. Similarly, all plots in a given column have the same second parameter value, but different first parameter values. For the purposes of this simple example, it is assumed that only one variable parameter changes for each row, and only one variable parameter changes for each column. More complex examples involving multiple variable parameters for each row and column will be discussed in more detail below. In the example shown in FIG. 2, $\phi_s$ has the same value for all displays in a given column, and $\phi_c$ has the same value for all displays in a given row.

In one aspect of the present invention, a GUI is provided that allows the user to input the data needed to create a grid plot and to manipulate the sub-plots of the grid plot. To specify a grid plot, the user must provide the expression that defines the function to be plotted, the column variables and their ranges, the row variables, and their ranges, the values of any parameters that are to remain constant over the grid plot, such as $w_1$, $w_2$, and A discussed above, and the graphical format for the plot. The GUI facilitates the entry of this information.

Figure 3:
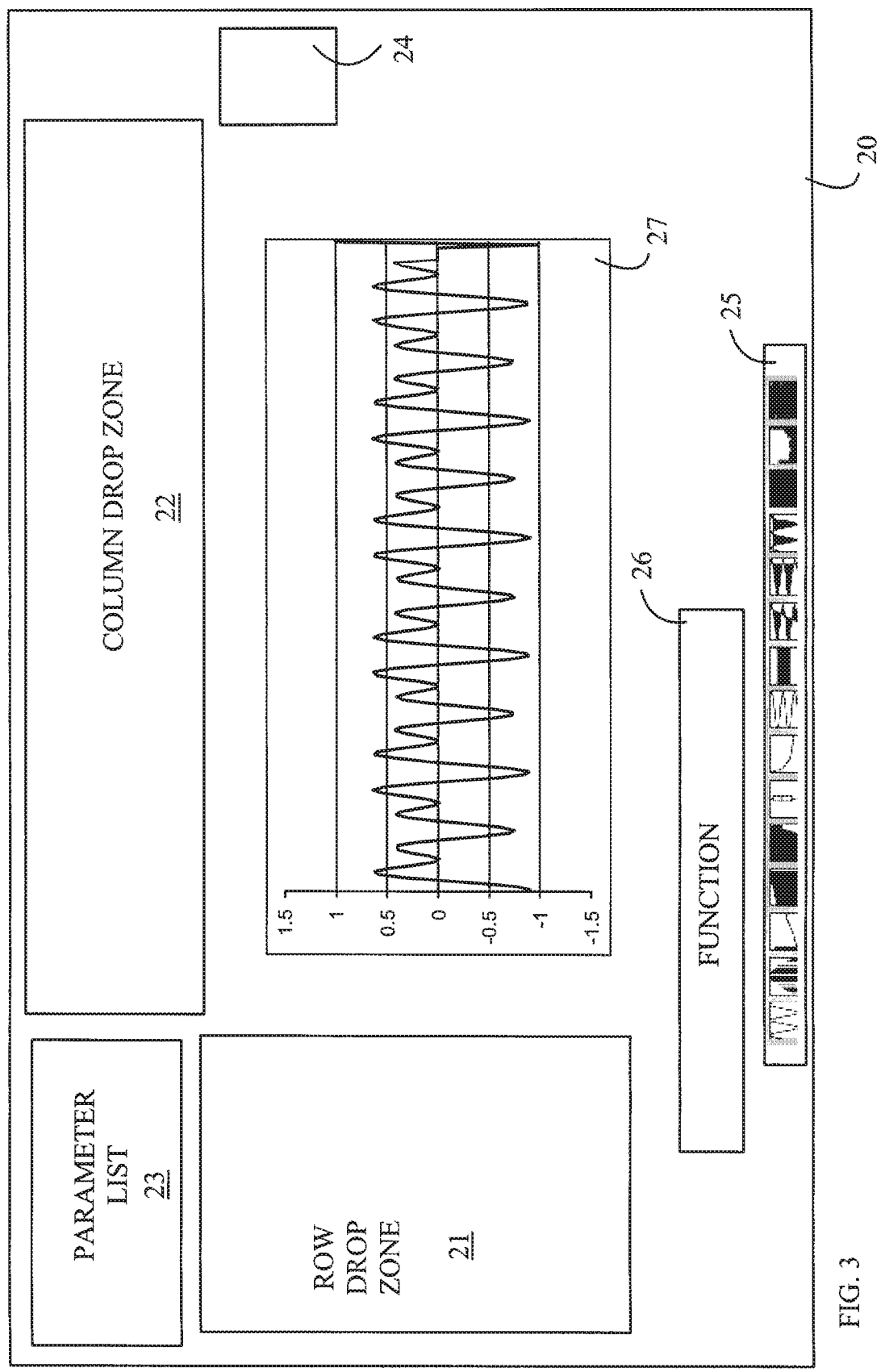
FIG. 3 illustrates one embodiment of a GUI according to the present invention.

Refer now to FIG. 3, which illustrates one embodiment of a GUI according to the present invention. GUI 20 is utilized to set up the system of the present invention prior to the generation of a grid plot such as the grid plot shown in FIG. 2. GUI 20 includes a function area 26 into which the user can type a string that specifies the expression whose values are to be graphed. To simplify the following discussion, the expression whose values are to be graphed will be referred to as the function that is to be graphed or just the function, unless the context indicates otherwise.

The manner in which the user specifies the function will be discussed in more detail below. GUI 20 also includes a graphical function area 25 which includes a plurality of icons that indicate the type of graph that can be generated for the function. In practice, the user selects one or more of these icons to define a "graphical format" for each sub-plot of the grid plot. A graphical format is defined to be the set of parameters that determine the axes of the graph and the visual attributes of the graph. As will be explained in more detail below, the graphical format may include a transform of the function that determines one or more axes of the graph. For example, a graphical format for a logarithmic plot of the function can be viewed as having the log transformation of the function built into the graphical format. Similarly, a graphical format for displaying the frequency spectrum of a time domain function f(x) has different axes from those used to display f(x). The graphical format can also include parameters such as any markers to be used to indicate the actual function values being displayed, whether or not the computed points are connected by curves such as lines, the line style and weight of the curves plotted, etc.

In this exemplary example, the user has selected one graphical format. The parameters that control the appearance of the sub-plots in the grid plot are presented to the user in area 24. These parameters include the parameters that define the axes of the graph, the marker type to be used, if any, for the graph points, etc. The user can edit these to further refine the sub-plots or utilize default values that are stored in the system. The manner in which the user edits the graphical parameters and/or varies one or more of the graphical parameters as part of the column or row parameters will discussed in more detail. A typical sub-plot of the grid plot is shown in area 27 for an exemplary one of the set of column and row variables.

The possible parameters that can be used for the row and column variables are displayed in a parameter list area 23. The user can select one or more parameters from parameter list area 23 for the row and/or column variables, by dragging the desired parameter to row drop zone 21 or column drop zone 22. The manner in which the parameter list displayed in the parameter list area 23 is generated and presented will be discussed in more detail below. Each parameter that is to be varied over the grid plot is assigned a plurality of values. In one exemplary embodiment, the range of values is defined by specifying a starting value, ending value, and a number of steps for the parameter. The user can edit the starting value, ending value and number of steps for each parameter in the parameter list or in the drop zones. These values define a plurality of values for the parameter in question, one of these values being used for each row if the parameter is in row drop zone 21, one of these values being used for each column in the grid plot if the parameter is in column drop zone 22.

In one aspect of the invention, all of the parameters listed in parameter list area 23 have default values for their starting and ending values and number of steps. Any of the default values can be edited by the user by selecting the value from parameter list area 23 and editing the value in place. Hence, all of the possible variable values associated with the function can be set prior to generating the grid plot.

Figure 4:
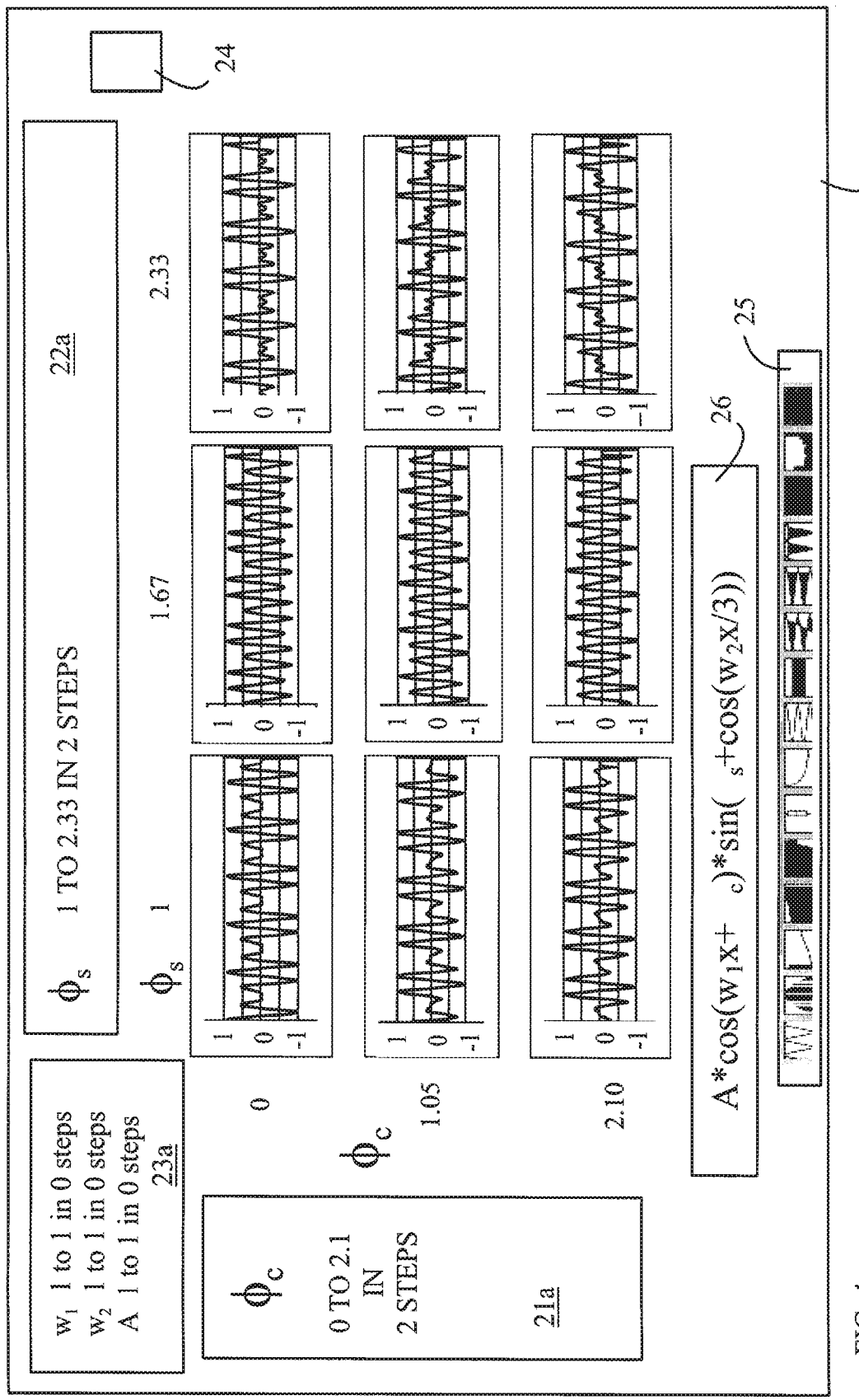
FIG. 4 illustrates the appearance of one exemplary embodiment of a GUI according to the present invention after the grid plot has been generated.

When the user signals the system of the present invention by activating a menu item or graphical icon, the system generates a grid plot according to the specifications entered into the GUI shown in FIG. 3. Refer now to FIG. 4, which illustrates the appearance of one exemplary embodiment of a GUI according to the present invention after the grid plot has been generated. The function of Eq. (1) has been entered into function area 26. The system deduced that there were five potentially variable parameters on which to base the grid plot. These five together with default values were displayed in parameter list area 23a. The user drug $\phi_s$ into the column drop zone and specified the starting and ending values and number of steps. Hence, $\phi_s$ is no longer in parameter list area 23a. The user also drug $\phi_c$ into the row drop zone and specified the starting and ending values and the number of steps. The remaining values in parameter list area 23a were either edited by the user to provide the desired values that are to remain constant across the grid plot or the default values were used. The system then generated the grid plot as shown in FIG. 4.

As noted above, more than one parameter can be varied for each row or column in the grid plot. Assume that the function being plotted depends on more than two parameters. For example, the function shown in Eq. 1 depends on the parameters, $\phi_s$, $\phi_c$, $w_1$, $w_2$, and A. One or more of these parameters could be chosen as row variable parameter(s). Similarly, one or more of these parameters could be chosen as column variable parameter(s). The remaining parameters are constant parameters for the purposes of the grid plot. If multiple parameters are used for the row parameters, there must be a specific value for each parameter assigned to each row of the grid plot. For example, in the case of a 3×3 grid plot in which $w_1$ and $\phi_s$ are selected as row variable parameters, there must be three $w_1$ values, one for each row, and three $\phi_s$ values, one for each row. Any remaining parameters that are not defined as row or column variable parameters by dragging them into row drop zone 21a or column drop zone 22a are set to corresponding constants for the purposes of the grid plot as discussed above.

Figure 5:
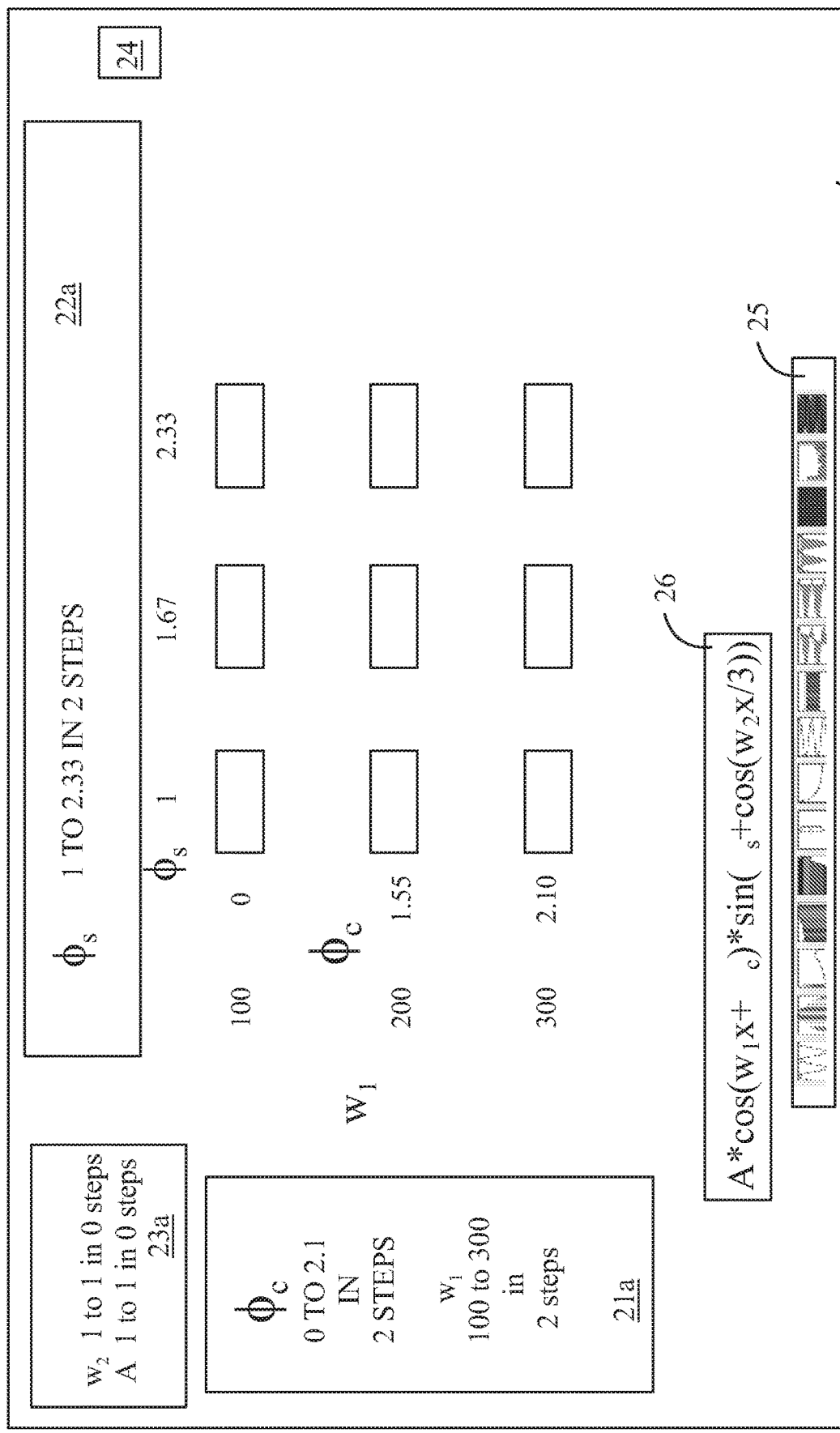
FIG. 5 illustrates the GUI in the case in which $w_1$ and $\phi_c$ are chosen as the row parameters and, is chosen as the column parameter.

Refer to FIG. 5, which illustrates the GUI in the case in which $w_1$ and $\phi_c$ are chosen as the row parameters and $\phi_s$ is chosen as the column parameter. In this case, row 1 corresponds to $w_1$=100 and $\phi_c$=0; row 2 corresponds to $w_1$=100 and $\phi_c$=1.55, and row 3 corresponds to $w_1$=300 and $\phi_c$=2.10. The column variable parameter remains the same as shown in FIG. 4. The parameter list area, row drop zone and column drop zone are shown at 23a, 21a, and 22a respectively.

In a more general case, the row and column parameters can be viewed as vectors. For example, the row parameter is a vector having a vector value assigned to each row, the vector value remaining constant for all sub-plots in that row. The components of the vector are the variable parameters chosen to vary over the rows. Similarly, the column parameters are vector values for a vector whose components are column parameters that vary from row to row. In the case shown in FIG. 5, the row vector has components ($w_1$, $\phi_c$) and the column vector has a single component $\phi_d$.

In the above described embodiments, the variable parameters that change between the sub-plots of the grid plot are parameters defined in the function being plotted. However, the variable parameters can also be parameters defined by the graphical format in which the function is presented. Each possible graph can include a number of graphical format parameters that control the appearance of the graph. These can include the line styles used to plot the curves, the shape and size of the markers on the lines at the actual calculated points, the range of independent variable values used on the graph, etc. In the above described embodiments, these parameters are displayed in area 24 of the GUI. In one aspect of the invention, the user can edit these parameters and/or drag them from area 24 into the row and column drop zones so that the parameters can vary across rows or columns in a manner analogous to that described above for the variable parameter of the function.

The graphical format parameters are also examples of parameters that may not change in a continuous manner, and hence, may not be subject to a definition of the form starting value, ending value, and number of steps. Some function variable parameters may also not be suitable for this type of specification. Accordingly, in one aspect of the invention, the user can select a plurality of different editing modes for defining the variable parameter values that are to be used for the sub-plots. In one of these modes, the user provides a list of the values to be used rather than the starting and ending values. This mode allows the user to accommodate values that change between discrete states, such as binary values representing whether a graph is to use a marker for the points or not or different categories, such as type of marker or font family.

Figure 6:
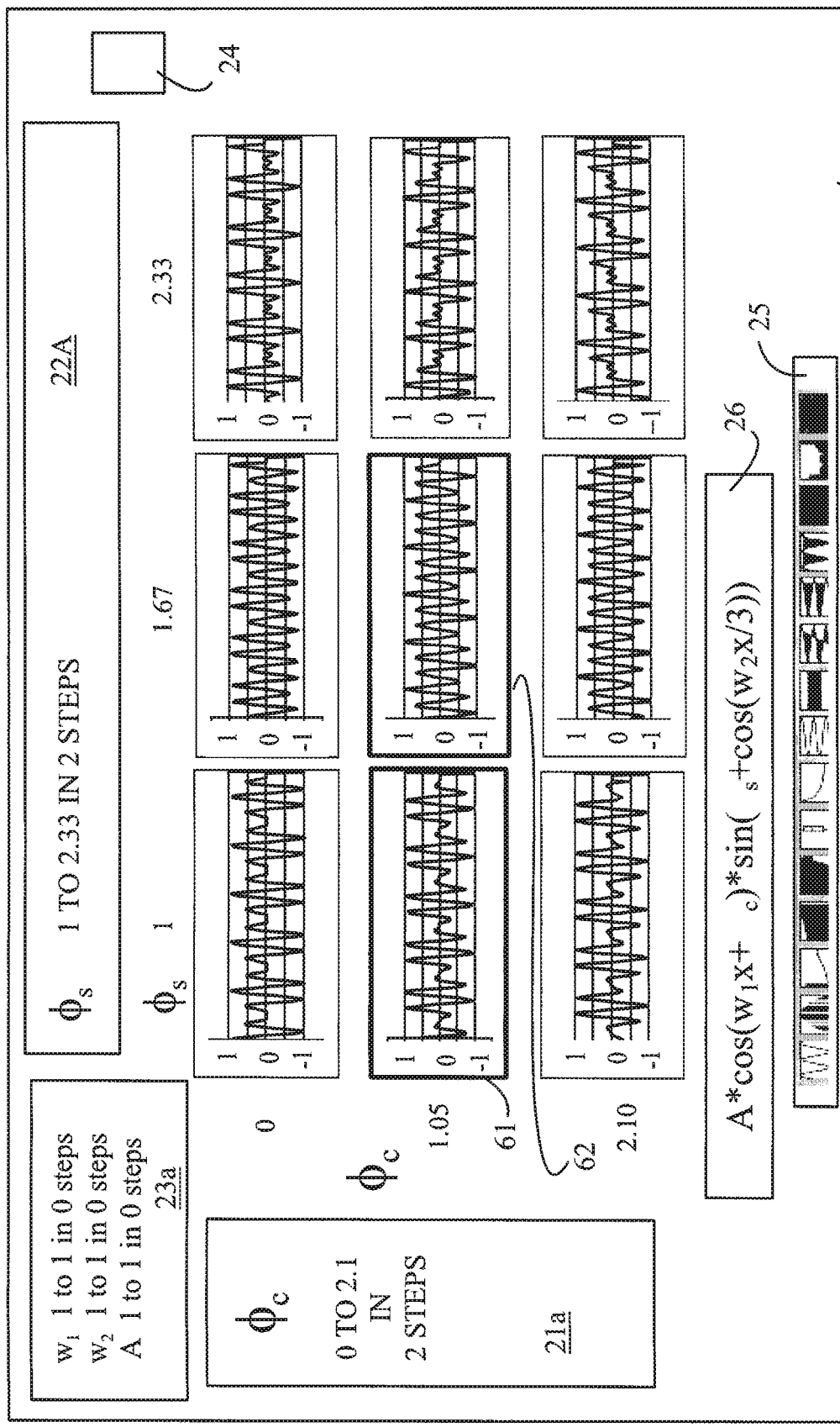
FIG. 6 illustrates the manner in which a user selects two sub-plots to compare.
Figure 7:
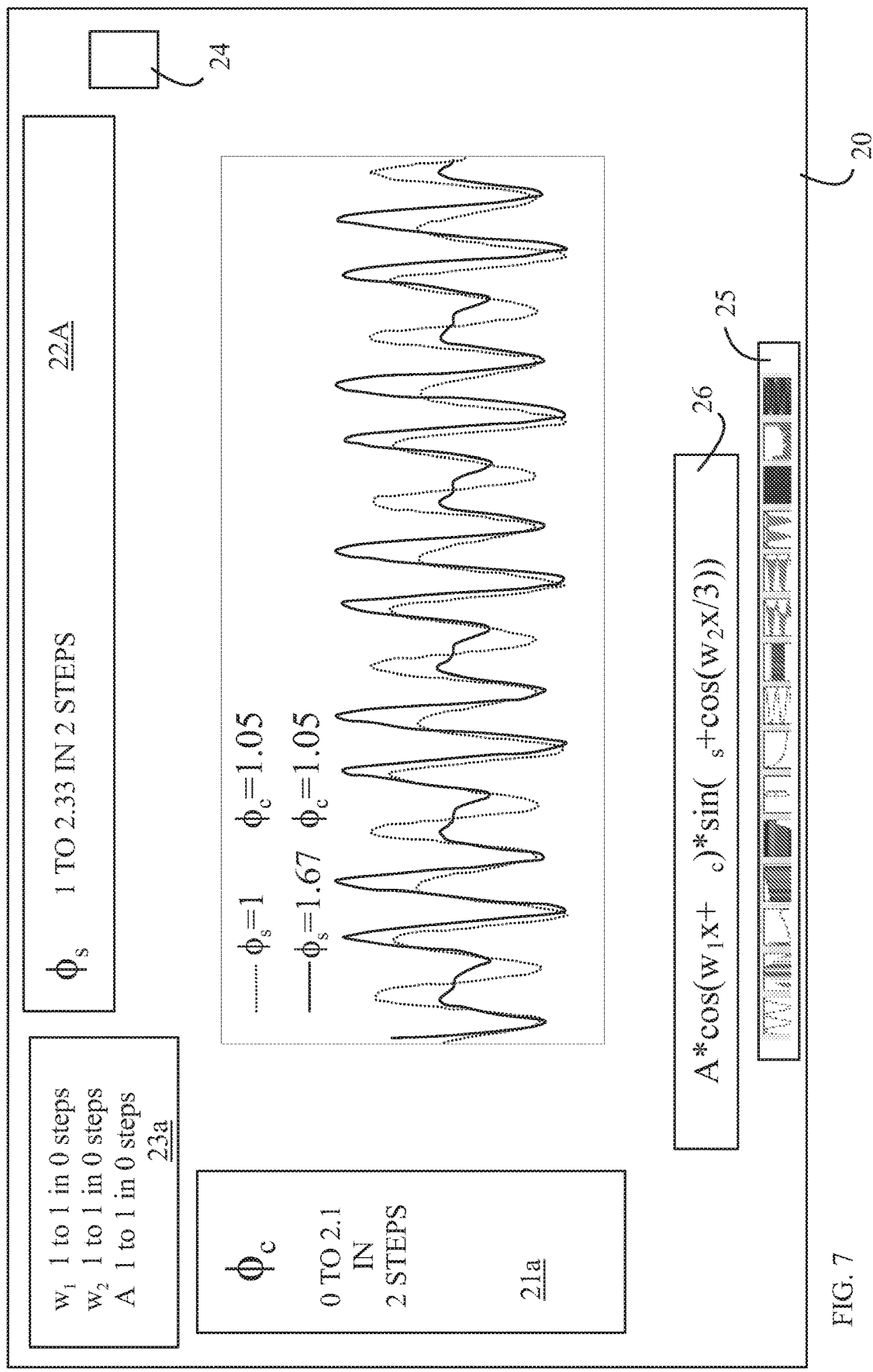
FIG. 7 illustrates the manner in which a user compares two sub-plots as an overlapped plot.

Merely visualizing the sub-plots in a grid plot may not be sufficient to provide the user with detailed information needed to understand the functional variations from sub-plot to sub-plot. In another aspect of the invention, the system of the present invention provides a mechanism for overlaying two or more sub-plots in a manner that allows the user to more easily view the differences in the sub-plots. Refer now to FIG. 6, which illustrates the manner in which a user chooses two sub-plots to compare. FIG. 6 displays the same grid plot as FIG. 4 discussed above. The user selects two of the sub-plots with a pointing device and the system highlights those sub-plots as shown at 61 and 62. The user then selects a compare function from a menu and the system replaces the grid plot with a "compound plot" of the two selected sub-plots as shown in FIG. 7. A compound plot is defined to be a plot in which the curves from two or more sub-plots are graphed on the same plot axis. The curves from the two sub-plots are plotted using different line styles or colors to enable the user to see the differences in the two curves. Compound plots with more than two sub-plots can also be generated.

If more than three sub-plots are overlaid, separating the sub-plots in the combined view can present challenges even when the curves are plotted using different lines, styles or symbols. In one aspect of the invention, the user selects one of the curves in the sub-plot for emphasis by having the mouse cursor hover over the corresponding entry in the legend of the plot. That curve is then plotted over all of the other curves in that it is drawn after each of the other curves is drawn. When the mouse cursor moves to a different legend entry, the associated curve is drawn. Being able to switch the drawing order of the curves quickly, while keeping their other graphics parameters the same, allows rapid comparison of small details with minimal eye movements while eliminating curve occlusion.

Figure 8:
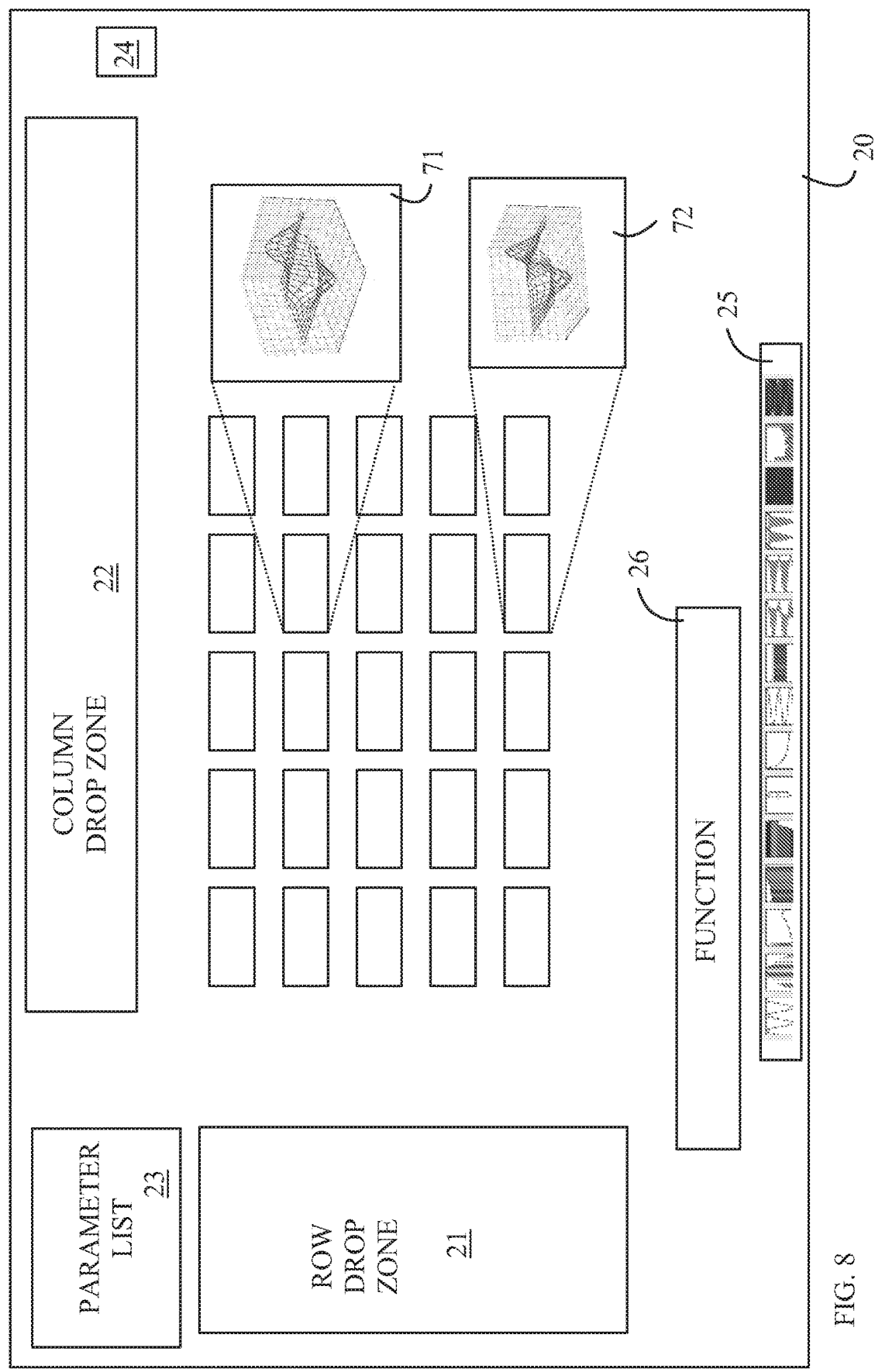
FIG. 8 illustrates a grid plot in which each sub-plot is a surface plot of a two-dimensional function, and the viewpoint of the sub-plots is one of the row parameters, such that plots in different rows have different viewpoints.

In the above-described examples, the function being plotted has only one independent variable, x, in each sub-plot. However, embodiments in which the sub-plots have multiple independent variables can also be constructed, provided there is a graphical format that can visualize the multi-dimensional graph. This feature is particularly well suited to functions having two independent variables which can be plotted as surface graphs or three-dimensional graphs in which the third dimension is represented by color or a gray level. For example, the third dimension values can be mapped to a different gray level that depends on the value or to a color that changes continuously in intensity and/or a color with the third dimension value. In another example, a surface view of the three-dimensional graph is used, and the viewing location used to generate the view can be a variable parameter in either the rows and/or columns. In this type of grid plot, different perspectives of the surface can be easily compared to detect features that might be hidden in one viewing location, but visible in another. Refer now to FIG. 8, which illustrates a grid plot in which each sub-plot is a surface plot of a two-dimensional function, and the viewpoint of the sub-plots is one of the row parameters, such that plots in different rows have different viewpoints. Exemplary surface plots are shown at 71 and 72. To simplify the drawing, the row and column variable parameters and the function have been omitted from the drawing.

In the above-described embodiments, each sub-plot in the grid plot consisted of a single graph. However, embodiments in which each sub-plot includes a plurality of graphs can also be generated by the present invention. All of the graphs in a given sub-plot have the same variable parameters. However, the graphical forms may be substantially different and the plot axes may also be different. For example, consider a time domain function f(a,x). A second useful plot for this function might be a graph of the amplitude of the Fourier transform of f(a,x). In the more general case, a graph for a sub-plot could be any transformation G of f(a,x). The independent variable plotted for G(f(a,x)) may be different from x, as is the case in the Fourier transform example. The different graphical formats can be specified by selecting multiple graphical formats from graphical function area 25. In one aspect of the invention, transformations, such as G, may be included in one or more of the graphical formats. For example, one of the graph types could include a graph of the log(f(a,x)) or a Fourier transform of f(a,x).

Figure 9:
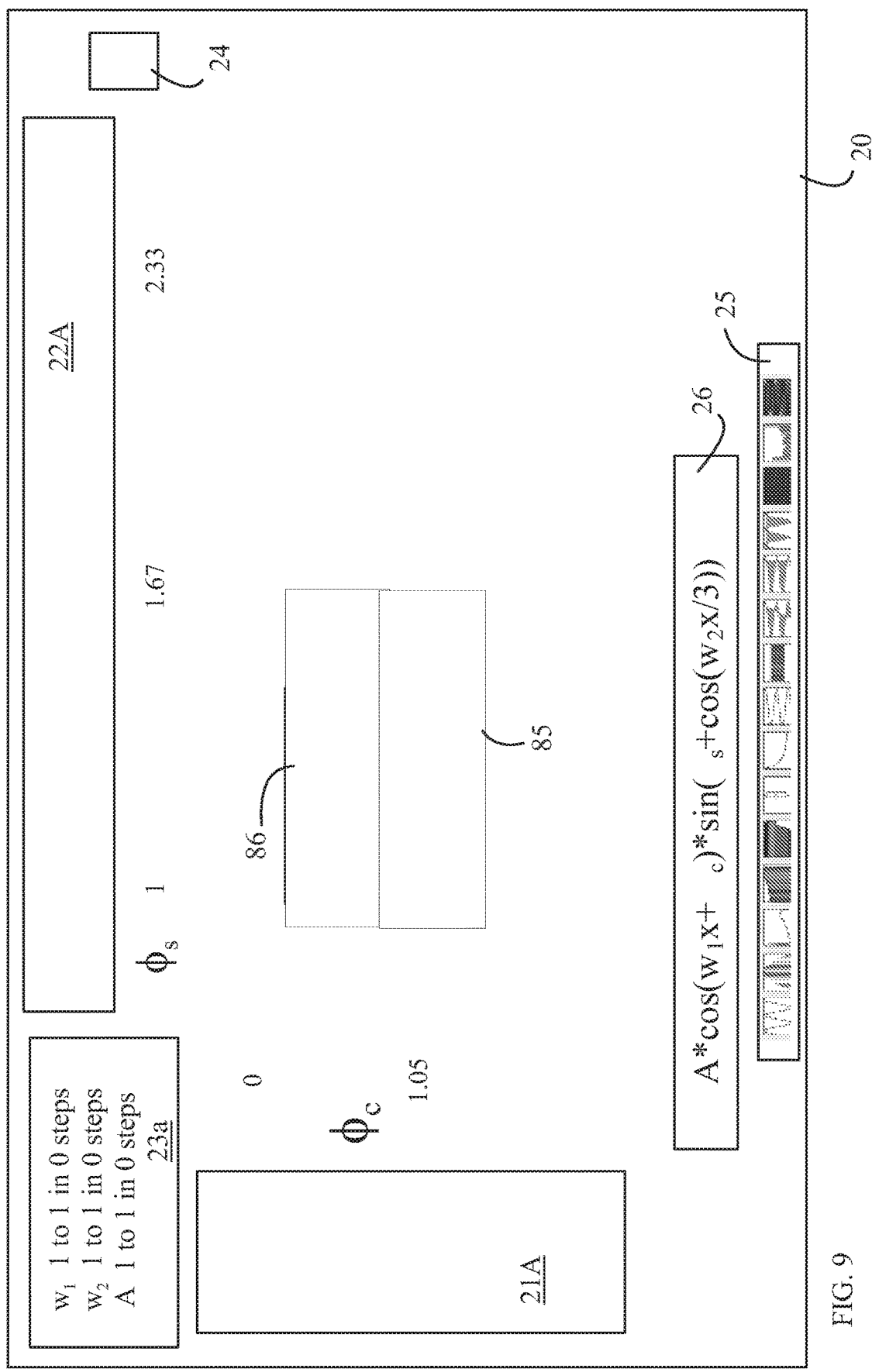
FIGS. 9 and 10 illustrate the generation of a multi-graph grid plot that utilizes a transformation that is included in the possible graph shown in graphical function area 25.
Figure 10:
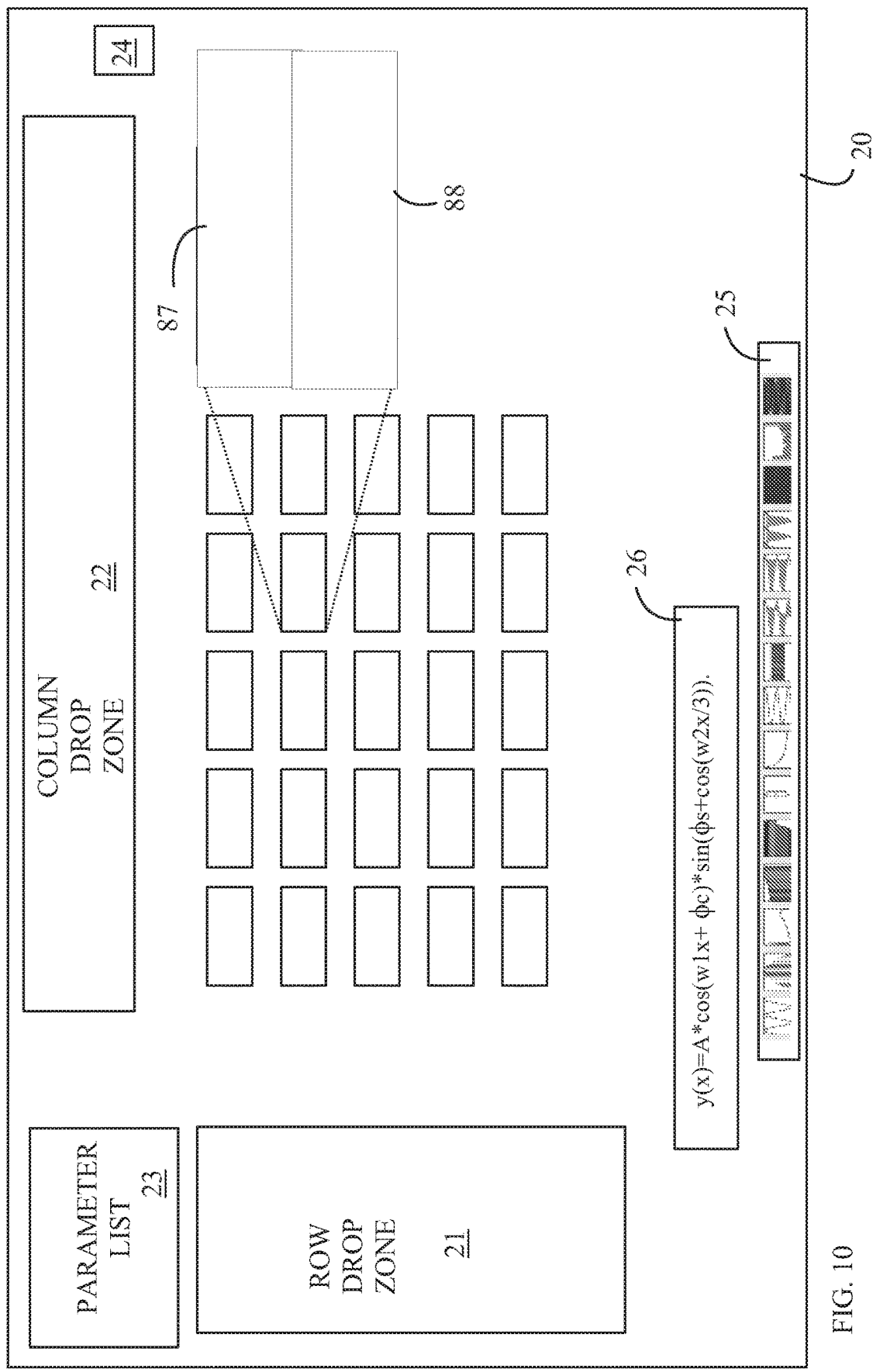

Refer now to FIGS. 9 and 10 which illustrate the generation of a multi-graph grid plot that utilizes a transformation that is included in the possible graphical formats shown in graphical function area 25. Refer first to FIG. 9. In this example, the transformation is log(|f(a,x)|). The user selects a conventional graphical format for f(a,x) and a second graphical format having the example transformation. GUI 20 then displays an exemplary sub-plot for this choice, which now includes graphs 85 and 86. When the user drags parameters into the row and column drop zones, the system generates the plot shown in FIG. 10. Each sub-plot in the grid plot now includes two graphs such as the graphs shown at 88 and 87.

In the above-described examples, the function being plotted was scalar valued. That is, f(a,x) was a single number for any particular value of a and x, or a and (x,y). However, the present invention can also be used with vector valued functions. For the purposes of this discussion, a vector valued function is defined to be a function that produces a plurality of component values for each (a,x). In one embodiment, each sub-plot in a grid plot display includes multiple graphs, one for each component of the vector. That is each component of the vector is displayed in a different graph within the sub-plot. In one exemplary embodiment, the user specifies the different components by typing the formula for each component into function area 26. Such graphical arrangements are analogous to the multiple graph sub-plots discussed above, and hence, will not be discussed in more detail here.

In the above-described embodiments, the user types the expression to be evaluated and the results are displayed in the GUI. The function defined by the expression must be one that can be parsed by the computer into constants and "elementary functions." For the purposes of this discussion, an elementary function is defined to be a function for which the computer already has the code to compute that function given a predetermined set of variable parameters and one or more independent values. Some elementary functions depend only on the independent variable. The functions in a typical math library such as the trigonometric functions are examples of such functions. Other elementary functions require that values be provided for one or more variables in addition to the independent variable before the function can be evaluated. The required parameters may be used as variable parameters in a grid plot or as parameters with fixed values that remain the same over all sub-plots of a grid plot. These elementary functions will be referred to as "augmented elementary functions." It should be noted that the user may not know the names of these built-in required parameters. For example, the system may include a function for the amplitude of a general sinusoidal wave, e.g., $$\text{wave}(x) = \text{amplitude} * \sin(\text{frequency} * x + \text{phase}).$$

If the user types the function wave(x) as part of the user function definition, the computer will display the list of parameters in the parameter list region described above. In one aspect of the invention, the computer assigns names to these parameters that reference the function name and the parameter name, such as "wave.amplitude" to remind the user of the parameter in question.

This aspect of the invention can be used to provide proprietary functions to the user without revealing the underlying code. The producer of the function code only needs to provide the binary code for the function calculation and a list of the parameters that the user can vary. Consider an electronics manufacturer that produces a component that is used in a larger system. The component transforms a signal to a new signal that depends on the required parameters. For example, the function could describe the band pass of a proprietary function provided by the manufacturer. The user wants to view the response of a system that utilizes this component as part of a larger function that the user wishes to explore using the grid plots of the present invention. The present invention allows the user to explore the response of the component as well as the response of the larger system without knowing the proprietary information included in the function code.

In one aspect of the invention, the user can select a function name in the expression typed by the user into function area 26 by positioning the cursor over the function name and clicking on the name. A list of the parameters that the user can vary in that function are then displayed separately in parameter list area 23. The user can then edit these and/or drag them into the drop zones. When the user clicks on a different function name, the parameters in the list area are changed to those associated with the new function name. This aspect of the present invention provides a mechanism for dealing with the potentially large number of parameters that may be needed to evaluate a complex expression. In addition, it relieves the user of the chore of remembering the parameters associated with each augmented elementary function.

In one exemplary embodiment, when the user selects an augmented elementary function from function area 26, the computer examines the word at the selected location and compares it to a list of augmented elementary functions stored in the system. The list includes a list of the parameters that need to be defined. Alternatively, the list of parameters associated with the function can be derived by 'reflection' if that is supported by the underlying system. If the word at the cursor location matches a function in the list, the parameters associated with that augmented elementary function are displayed for possible editing and dragging into the drop zones. When the user de-selects the word by clicking on another word, the list disappears.

In another exemplary embodiment, the system of the present invention updates the display in real time as the user inputs or changes the expression and/or parameter values. For the purposes of this example, assume that the user has selected a graphical format prior to inputting the expression to be graphed into function area 26. Function area 26 includes a text box into which the user types the expression to be graphed. As the user types the expression one character at a time, the cursor moves in the text box in increments of one character. At each new cursor position, the data processing system checks to see if the cursor has moved to the end of a word and whether the portion of the expression typed to that point is a valid expression. For the purposes of this discussion, an expression is defined to be valid if the data processing system can evaluate the expression given values for all of the variable parameters that have already been defined.

When the cursor moves to end of a word that may be the name of an augmented elementary function, the data processing system checks that word against a database or other list that associates the name of each possible augmented elementary function with the parameters needed to evaluate the augmented elementary function. If the name is in the list, the data processing system displays the variable parameters in parameter list area 23 together with the default values for the variable parameters. The data processing system also creates an entry in another list for the instance of the defined augmented elementary function in the specification. This second list stores the specific parameter values for this instance of the augmented elementary function in the expression. If the specific augmented elementary function appears more than once in the expression, each instance of the augmented elementary function will be assigned a separate entry in that list so that different values for the variable parameters can be used for the different instances of that augmented elementary function. If a new instance of an augmented elementary function was discovered, the variable parameters appear in the parameter list area 23. At this point, the user can modify the values from the default values and drag selected ones of the variable parameters into the column and row drop zones.

Each time a change is made to one of the variable parameters defined to this point, the data processing system updates the graphical display. If column or row parameters have been defined at this point, the graph will be the exemplary sub-plot shown in FIG. 3 with the variable parameters set to their current values. If row and column parameters are defined at this point, the grid-plot specified by the current state of the variable parameters will be provided. At this point, the user can go back to typing the expression in function area 26 or the user can change some other parameter and view the corresponding changes in the plot. For example, the user could change the parameters associated with another augmented elementary function that had already been defined in the partially typed expression by clicking on the augmented elementary function name in the expression. The variable parameters associated with the selected augmented elementary function name would then be provided in the parameter list area 23 for editing or dragging into the drop zones. Each time a change is made, the data processing system updates the plot.

When the user returns to typing the remainder of the expression, the data processing system again monitors the cursor position and contents of function area 26 to determine if another augmented elementary function has been indicated and whether the expression to that point is valid. The process continues until the user has typed the entire expression and that expression is valid. The user can then change any of the parameters by selecting an instance of the augmented elementary function name in the expression in function area 26 and changing the value for that instance of augmented elementary function. The user can also change the graphical format parameters or change the variables that are in the drop zone. Each time a change is made, the data processing system displays a new grid plot.

As the complexity of the function increases, the number of required parameters that must be provided can become large. In the above-described embodiments, the user is permitted to define variable parameters in the expression while typing. For example, the user, in effect, specifies the parameters A, $w_1$, $\phi_c$, $\phi_s$, and $w_2$. If the expression also includes a number of augmented elementary functions, even more variable parameters will need to be defined. In a simplified exemplary embodiment of the present invention, the expression to be evaluated is limited to an expression involving fixed numeric constants, e.g. "10", elementary functions, and augmented elementary functions. As the user types the expression, the computer identifies the function being typed, either during the input of the function or immediately after the elementary or augmented elementary function is completed. If the function is an augmented elementary function, the computer immediately lists the possible variable parameters and their default values in parameter list area 23 of the GUI. The user then edits any of these that the user wishes to change and drags any of the variable parameters that are to be varied across the grid plot into drop zones 21 and 22. When the user drags parameters into the drop zones, these parameters are removed from parameter list area 23, thereby simplifying the amount of information in that region.

In addition, as the function to be plotted becomes more complex, the expression to be evaluated, itself, can become difficult to enter without errors. In one aspect of the invention, the data processing system stores prior defined function names and exemplary parameter values. The exemplary parameter values are provided in place of the default values. Hence, when a user wishes to suspend operation and return to the problem later, these values do not need to be re-entered. However, since the system may be used by multiple users or a user who is exploring a number of different functions, in one embodiment of a system according to the present invention, the data processing system allows the user to define a "project". When the user opens a defined project, the previously defined functions and exemplary values are recovered. If the user starts a new project, the system will return to the default values.

In another aspect of the invention, the user can define an augmented elementary function by typing the function into the function string area and assigning it a name that indicates the independent variable(s) associated with the function. For example, the user could type the expression, amplitude*sin (frequency*x+phase). After exploring the behavior of the function with one or more grid plots, the user can then select a create function option and type in the name wave(x) for the function. The data processing system would then provide the code for that function and list the potential variable parameters in a database that associates the various augmented elementary functions and the parameters associated with those augmented elementary functions. The next time the user wants to include this function as part of a larger function, the user only needs to type wave(x). The data processing system would then lookup the parameters associated with wave(x) in the internal database and automatically enter them into the parameter list area together with the last values and/or ranges for the parameters.

The present invention also includes computer readable media that includes instructions that cause a data processing system to execute the method of the present invention. For the purposes of this discussion, computer readable media include any medium that is patentable subject matter under 25 U.S.C. 101 and excludes any medium that is not patentable subject matter under 35 U.S.C. 101. Examples of computer readable media include non-transitory media such as computer disk and non-volatile memory in all of its forms.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to provide a graphic visualization of a function, said method comprising:
   causing said data processing system to present a first GUI to a user on a display associated with said data processing system;
   causing said data processing system to receive a text string that defines said function in terms of variable parameters and elementary functions;
   causing said data processing system to provide a list of said variable parameters;
   receiving user input specifying row and column parameters selected from said list of said variable parameters; and
   generating a grid plot of said function on said display.

2. The method of claim 1 further comprising causing said data processing system to provide values for said variable parameters that are not specified as row or column parameters.

3. The method of claim 1 wherein said elementary functions include augmented elementary functions characterized by internal variable parameters and wherein said internal variable parameters associated with said augmented elementary functions are included in said list of variable parameters.

4. The method of claim 1 wherein said data processing system stores default values for said variable parameters.

5. The method of claim 4 wherein said default values comprise values that were previously assigned to said variable parameters.

6. The method of claim 1 further comprising:
   receiving user input specifying a first sub-plot and a second sub-plot from said grid plot;
   causing said data processing system to provide a compound plot from said first and second sub-plot; and
   displaying said compound plot on said display.

7. The method of claim 1 further comprising:
   causing said data processing system to provide a list of possible graphical formats to be used in generating said grid plot;
   receiving user input specifying one of said graphical formats in said list; and
   causing said data processing system to generate said grid plot using said one of said graphical formats.

8. The method of claim 1 wherein each sub-plot of said grid plot comprises a plurality of different graphs of said function, each graph being presented in a different graphical format.

9. The method of claim 1 wherein one of said row parameters or one of said column parameters comprises a graphical variable parameter that determines an appearance of a graphical format used to generate said grid plot.

10. The method of claim 1 wherein said function comprises a two-dimensional function.

11. The method of claim 1 wherein said function is a vector-valued function.

12. The method of claim 1 wherein said first GUI comprises a text box configured to allow a user to input said text string, said text box being characterized by a cursor location indicating a current position in said text box at which characters are entered in response to said user input, said data processing system checking a word that was just finished being entered in response to said user input for a name of a possible augmented elementary function at said cursor location, said name identifying said augmented elementary function having said name, and assigning an instance of said augmented elementary function corresponding to said identified augmented elementary function whose name matches said name to said word.

13. The method of claim 12 wherein said identified augmented elementary function is characterized by a variable parameter and wherein said data processing system displays said variable parameter together with a default value for said variable parameter in a region of said first GUI when a user selects that instance of said augmented elementary function in said text box.

14. The method of claim 12 wherein said data processing system is configured to receive user input selecting one instance of an augmented elementary function in said text box and to display said variable parameters associated with that instance of said augmented elementary function in said parameter list area.

15. The method of claim 12 wherein said data processing system updates a graph of an expression defined by said text string each time a variable parameter or a column parameter or a row parameter is altered in response to user input.

16. A computer readable medium containing instructions that cause a data processing system to execute a method when loaded into said data processing system, said method comprising:
   causing said data processing system to present a first GUI to a user on a display associated with said data processing system;
   causing said data processing system to receive a text string that defines said function in terms of variable parameters and elementary functions;
   causing said data processing system to provide a list of said variable parameters;
   receiving user input specifying row and column parameters selected from said list of variable parameters; and
   generating a grid plot of said function on said display.

17. The computer readable memory of claim 16 further comprising:
   receiving user input specifying first and second sub-plots from said grid plot;
   causing said data processing system to provide a compound plot from said first and second sub-plot; and
   displaying said compound plot on said display.

18. The computer readable memory of claim 16 wherein each sub-plot of said grid plot comprises a plurality of different graphs of said function, each graph being presented in a different graphical format.

19. The computer readable memory of claim 16 wherein one of said row parameters or said column parameters comprises a graphical variable parameter that determines an appearance of a graphical format used to generate said grid plot.

20. The computer readable memory of claim 16 wherein said first GUI comprises a text box configured to allow a user to type said text string, said text box being characterized by a cursor indicating a current position in said text box at which characters are entered in response to said user input, said data processing checking a word that was just finished being entered in response to said user input for a name of a possible augmented elementary function at said cursor location, identifying said augmented elementary function having said name, and assigning an instance of a said augmented elementary function corresponding to said identified augment elementary function whose name matches said name to said word.

\* \* \* \* \*